United States Patent
Barberis et al.

(10) Patent No.: US 7,107,049 B2
(45) Date of Patent: Sep. 12, 2006

(54) SYSTEM AND METHOD FOR EMULATING MOBILE NETWORKS AND RELATED DEVICE

(75) Inventors: Sergio Barberis, Turin (IT); Valerio Bernasconi, Turin (IT); Danilo Bessone, Turin (IT); Simone Bizzarri, Turin (IT); Marco Ferrato, Turin (IT); Daniele Franceschini, Turin (IT); Nicola Magnani, Turin (IT); Andrea Nicastro, Turin (IT)

(73) Assignee: Telecom Italia S.P.A., Milan (IT)

( * ) Notice: Subject to any disclaimer, the term of this patent is extended or adjusted under 35 U.S.C. 154(b) by 0 days.

(21) Appl. No.: 10/491,208

(22) PCT Filed: Sep. 26, 2002

(86) PCT No.: PCT/IT02/00614

§ 371 (c)(1),
(2), (4) Date: May 5, 2004

(87) PCT Pub. No.: WO03/028394

PCT Pub. Date: Apr. 3, 2003

(65) Prior Publication Data

US 2004/0209612 A1 Oct. 21, 2004

(30) Foreign Application Priority Data

Sep. 28, 2001 (IT) .................. TO2001A0924

(51) Int. Cl.
*H04Q 7/20* (2006.01)
(52) U.S. Cl. ....................................... 455/423
(58) Field of Classification Search ................. 455/423
See application file for complete search history.

(56) References Cited

OTHER PUBLICATIONS

Seawind:A Wireless Network Emulator by Kojo et al. (univ. of Helsonki, Sep. 2001).
Necessity of an Emulator to Validate New Resources . . . by Bourgois et al. (IEEE May 2001).

*Primary Examiner*—William D. Cumming
(74) *Attorney, Agent, or Firm*—Andrew Wilford

(57) ABSTRACT

A system and related device emulates the behavior of mobile networks independently from the manner of collecting data about the behavior of the network obtained through a simulation of field measurements. The system emulates the behavior of the network during the exchange of information between terminals and uses an emulation device comprising two circuit blocks. The first is able to process the information according to time sequences corresponding to those of mobile networks. The second one exchanges information between the terminals connected to suitable interfaces. This architecture makes it possible to emulate uplink and downlink functions of the mobile network, displaying on the terminals the effects of the behavior of the network under various operating conditions.

13 Claims, 2 Drawing Sheets

SYSTEM AND METHOD FOR EMULATING MOBILE NETWORKS AND RELATED DEVICE

CROSS REFERENCE TO RELATED APPLICATIONS

This application is the US national phase of PCT application PCT/IT02/00614, filed 26 Sep. 2002, published 3 Apr. 2003 as WO 03/028394, and claiming the priority of Italian patent application TO2001A000924 itself filed 28 Sep. 2001.

FIELD OF THE INVENTION

The present invention relates to a system for emulating the behavior of a network of mobile radio apparatuses (mobile radio) and to the apparatus that allows to implement said system.

In particular, the present invention relates to an emulation system that, for given services required by a user with a terminal inserted in the mobile network, is able to represent, also visually, the result which said user can perceive as a level of service.

BACKGROUND OF THE INVENTION

As is well known, the widespread use of mobile networks has led to a rapid expansion of the services available on such networks, such as services for accessing the Internet to use electronic mail (E-Mail) and/or Web-Browsing tools. In this context, a fundamental need for an operator who provides network services, such as Internet access services, is to verify the characteristics of the network and to dimension it correctly according to users' requirements, for instance in terms of response times. To achieve such aims, operators use, as is well known, either field measurements or simulation tools which, according to the number of apparatus, characteristics of the environment, etc., allow to obtain statistics pertaining to parameters such as:

number of serviced calls;

number of blocked calls; etc.

and to generate tables or graphs representing such parameters.

Simulation tools (simulators), in particular, which as is well known are constituted by program packets (software), also comprise, in some case, emulation tools allowing to represent, in rough fashion, the effects that the results of the simulation induce on users' terminals.

As is well known, however, such emulation tools, being intrinsically associated to the simulators, are preferably not usable to provide punctual, instant by instant representation of ongoing phenomena in the mobile network, such as channel availability, time slot availability, etc. Known emulation tools, being of the software type and dependent on the simulators, have insurmountable limits to real time emulation of phenomena that take place in the network, since:

they preferably depend on the characteristics of the type of Work Station (hardware) that houses the software, in the sense that the speed of the hardware whereon the software programs are installed affects perceptible results;

they preferably depend on the simulator, which is generally of the statistical type, and on the tools used to perform the simulation since the emulation is, in fact, obtained as a byproduct of the simulation.

Therefore, known emulation tools, due to the intrinsic limitations described above, are not able adequately to represent the behavior of the network in real operating conditions and, in particular, are not able to represent on a terminal that is similar to the one actually utilized by the user, the result of operations, for instance, of "Web-Browsing", taking into account the various parameters that affect, instant by instant, the activity of the network itself.

OBJECTS OF THE INVENTION

The aim of the present invention is to provide a system that allows to emulate the effects of the behavior of the mobile network in terms of representation of the result perceptible by the user, independently from the analysis means used to obtain said behavior, be they simulation tools or field measures.

Another aim of the present invention is to provide an emulation device that allows to emulate the exchange of information between mobile terminal and mobile network in a manner that is independent and autonomous with respect to any other tools tasked with representing the characteristics of the network.

SUMMARY OF THE INVENTION

The aim is achieved by the system according to the invention which comprises an emulation device able autonomously to process either field measurements or the results of a simulation and to manage them according to time cadences corresponding to the real times of handling the information by the analyzed network.

BRIEF DESCRIPTION OF DRAWINGS

This and other characteristics of the present invention shall become readily apparent from the following description of a preferred embodiment, provided by way of non limiting example with the aid of the accompanying drawings, in which.

BEST MODE FOR CARRYING OUT THE INVENTION

Figure 1:
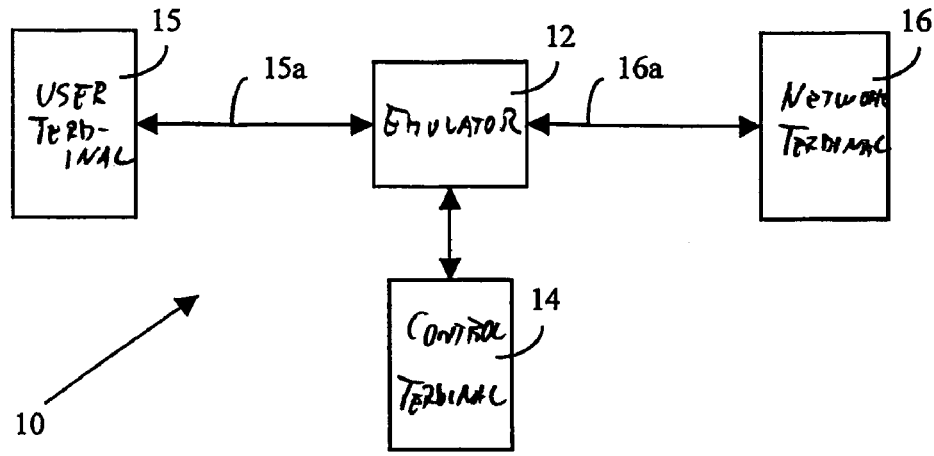
FIG. 1 shows a general block diagram of the system for emulating mobile networks, ac cording to the invention.

With reference to FIG. 1, a system 10 for emulating mobile networks, according to the present invention, comprises a user terminal 15, a network terminal 16, a control terminal 14, and an emulation device (emulator) 12. The emulator 12, in accordance with the present embodiment, is connected by means of a first connection 14a to the control terminal 14, by means of a second connection 15a to the user terminal 15 and by means of a third connection 16a to the network terminal 16.

The control terminal 14, for instance constituted by a known personal computer or PC, is able to exchange, in known fashion, by means of the connection 14a, for instance constituted by a serial or RS232 connection, data and commands with the emulator 12. In particular, the control terminal 14, in accordance with the present embodiment, is able, on the basis of application programs developed during the design of the system 10, to:

transfer to the emulator 12 files of commands that are representative of the behavior of the mobile network, both in user to network and in network to user transmission, and that are designed to control the operation of the emulator 12 itself, as will be described in detail hereafter;

display or store, as will be described in detail hereafter, results deriving from the activity of the emulator 12 and received by means of the connection 14*a*.

The user terminal 15, constituted for instance by a known personal computer or PC, is able to exchange, in known fashion, by means of the connection 15*a*, for instance constituted by an Ethernet connection, data and commands with the emulator 12. In particular, the user terminal 15, in accordance with the present embodiment, is able, on the basis of known application programs, through the connection 15*a*, to activate functions of:

Web-Browsing, and/or

E-Mail, and/or

Video streaming, in so-called "uplink mode" and to receive in reply, in so-called "downlink mode", the result of the activated operations, as will be described in detail hereafter.

In general, in accordance with the present invention, the user terminal 15 is able, on the basis of known application programs, to activate functions that require an exchange of information with additional terminals and to represent on the terminal itself 15, thanks to the emulator 13, the result of such operations with an effect equivalent to the one perceptible by the user in a real mobile network.

The network terminal 16, constituted for instance by a known work station, is able to exchange, in known fashion, by means of the connection 16*a*, for instance constituted by an Ethernet connection, data and commands with the emulator 12. In particular, the network terminal 16, in accordance with the present embodiment, is able, for instance, on the basis of known application programs corresponding to those activated by the user terminal 15, to respond to the functions activated by the user terminal 15 and transmitted to the network terminal 16 by means of the emulator 12 and of the connection 16*a*. For instance, the network terminal 16 is able to respond to Web-Browsing functions activated by the user terminal 15 and to transmit the result to the emulator 12 and therefrom to the user terminal 15.

In general, the network terminal 16 is able to respond, based on known application programs, to the functions activated by the user terminal 15 and to exchange data and command with the user terminal 15 by means of the emulator 12.

Figure 2:
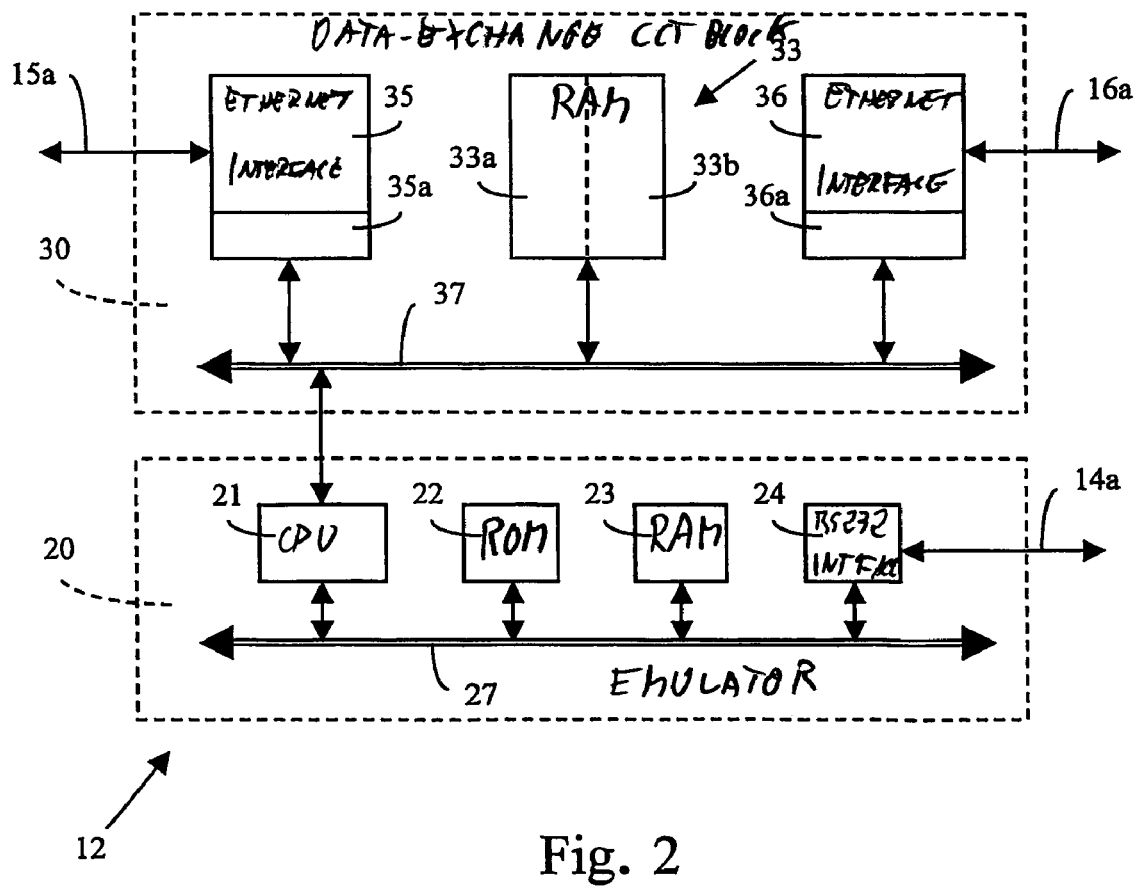
FIG. 2 shows a block diagram of the emulation device according to the invention.

The emulator 12, one of the characteristics elements of the present invention, is interposed between the user terminal 15 and the network terminal 16 and is able to intercept and control the exchange of data and commands (data) between the user terminal 15 and the network terminal 16, dynamically emulating the behavior of a mobile network, as is described in detail hereafter. The emulator 12 comprises, in accordance with the present embodiment, two circuit blocks, respectively a control circuit block (control block) 20 (FIG. 1 and FIG. 2), able to control the functions of the emulator 12, and a data exchange circuit block (data block) 30, able to manage the exchange of data between the user terminal 15 and the network terminal 16.

The control block 20 comprises a control unit (CPU) 21, a read-only memory (RON) 22, a random access memory (RAM programs and local data) 23 and a serial interface (RS232 interface) 24, all known, interconnected in known fashion by means of a data controls and commands channel (local BUS) 27 also known. The CPU 21, for instance of the 1960 type by Intel, is able to control the operation of the emulator 12 on the basis of programs predefined during the design step and stored in the RON 22 or coming from the control terminal 14, by means of the serial interface 14*a*. In particular, in accordance with the present embodiment, in the ROM 22 is stored an initialization program able to:

create two independent and "simultaneous" processes relating, respectively, the first one to the operation of the user terminal 15 in uplink mode (uplink process, i.e. from the user terminal 15 to network terminal 16), and the second one to the operation of the same user terminal 15 in downlink mode (downlink process, i.e. from the network terminal 16 to the user terminal 15);

create a third process (control process) able to wait for commands and parameters coming from the control terminal 14, and to store them in the program and local data RAN 23, and to manage them, as will be described in detail hereafter.

The data block 30 comprises a first Ethernet interface (user side interface) 35 and a second Ethernet interface (network interface) 36, able to be interconnected, respectively, to the connections 15*a* and 16*a*, a random access memory (data RAM) 33, and a data controls commands channel (data BUS) 37. Each Ethernet interface, 35 and 36, is associated to a corresponding logic circuitry for direct access to the data RAM 33, respectively user DMA 35*a* and network DMA 36*a*, and is able to exchange data, directly and independently from the CPU 21, with the data RAN 33. In particular, in accordance with the present embodiment, the user side interface 35 is able to exchange representative traffic data for service requests with a first portion of the data RAM (user RAM) 33*a* and the network interface 36 is able to exchange representative traffic data in response to the service request with a second portion of the data RAM (network RAM) 33*b*; the reading and writing of the data is controlled by the commands received from the CPU 21, according to the procedures described hereafter.

The control block 20 and the data block 30 are able to exchange data and commands between them by means of the CPU 21 that is interconnected both to the local BUS 27 and to the data BUS 37 and is able, in particular:

to transfer data from the data RAM 33 to the program and local data RAM 23, to process such data on the basis of the programs predefined during the design step, stored in the ROM 22 or coming from the control terminal 14, and of the commands and parameters coming from the control terminal 14, by means of the serial interface 14*a*, and to transfer the data processed by the program and local data RAM 23 to the data RAM 33.

The operation of the system 10 described heretofore is as follows:

Upon starting the emulator 12, the CPU 21, on the basis of the programs stored in the ROM 22, generates the uplink and downlink processes and the control process.

In a second step, in accordance with the present embodiment, the control process receives from the control terminal 14, through the connection 14*a*, a first file of commands representative of the behavior of the network in uplink mode (uplink file) and a second file. of commands representative of the behavior of the network in downlink mode (downlink file).

Figure 3:
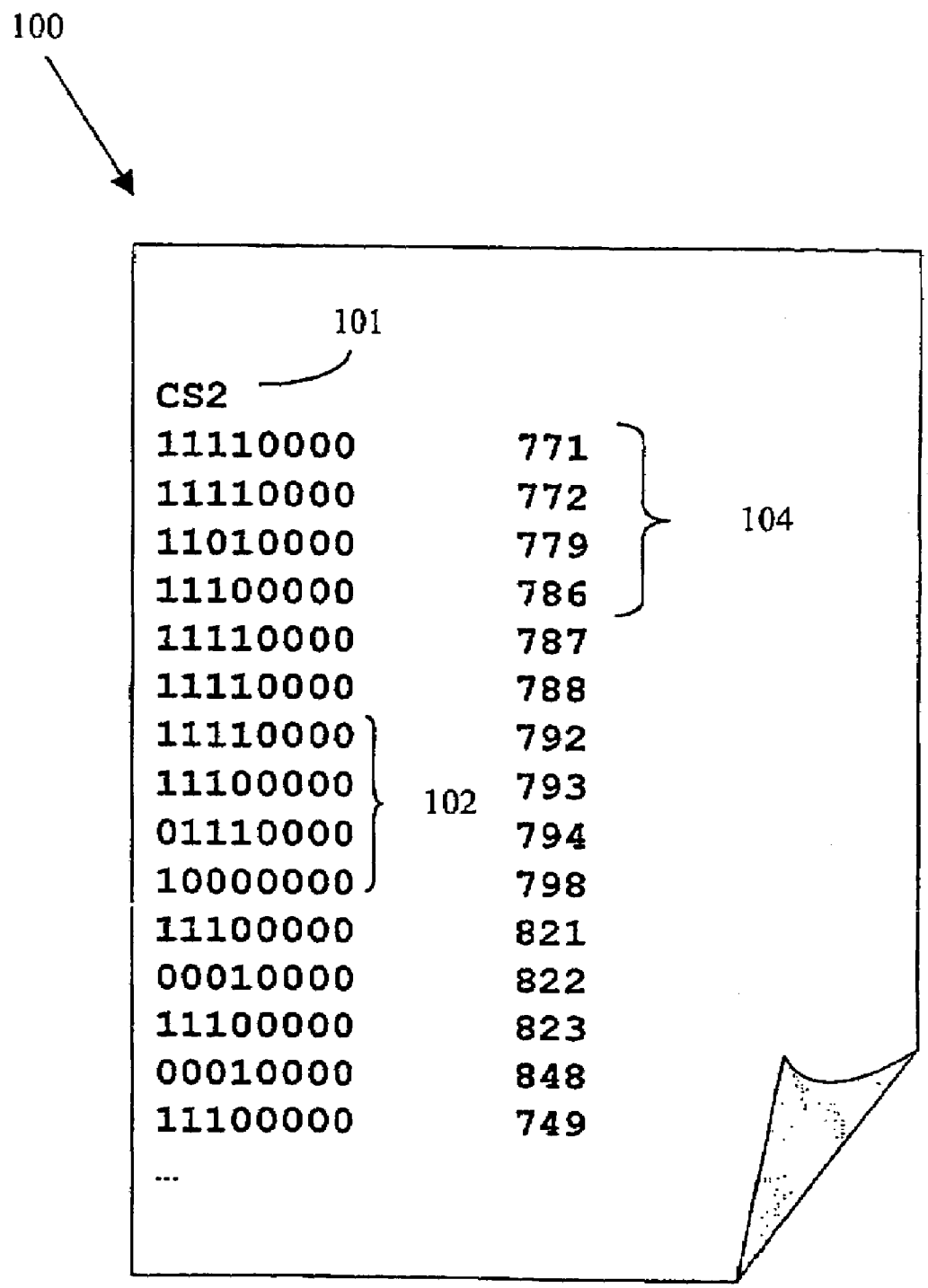
FIG. 3 shows an example of command files able to control the emulation device of FIG. 2.

Naturally, said command files have a shape and content that depends on the type of network to be emulated. For the sake of the completeness of the description, hereafter is provided an example of command file 100 (FIG. 3) usable to represent a GSM-GPRS (Global System for Mobile communications—General Packet Radio Service on mobile networks) network. As is well known, in this type of network the data traffic for the various types of service is handled (serviced) using radio carriers with predefined frequency and, within each radio carrier (FDMA access technique), by a determined "time slot" or slot (the physical channel proper) among those periodically available within the so-called time frame used on the radio interface (TDMA access technique). In this context, if a single user requests a data transmission, a whole slot of the GSM time frame of the duration of about 5 ms is allocated to that user for at least 4 time slots, i.e. 20 ms, and this implies a determined transmission rate, for instance 9.05 kbit/s nominal for the data coding called CS-1 or 13.4 kbit/s nominal for the data coding called CS-2. If, instead, multiple users simultaneously make a data transmission request, the single slot is shared among the same users, up to eight users, with the consequent decrease in the transmission rate, which therefore is a function of the number of users currently active in the network. The phenomenon described above has characteristics that are clearly different from the typical phenomenon of simple voice traffic transmission, for which, as is well known, the slot of the GSM time frame assigned to the user is attributed thereto in unique and exclusive fashion until the telephone call is completed. Based on such characteristics, typical of GSM-GPRS network, the example of command file 100, able to represent the behavior of this type of network, comprises 8-bit binary strings 102 in which each bit is representative, if its value is 1, of the possibility of occupation of the slot by the exchanged traffic, for instance data traffic, and in which each binary string 102 is representative of the behavior of the network with cadence of 20 ms (5 ms×4 time frames). In the example, each binary string 102 has, associated thereto, an index 104, indicative of the time frame to be emulated; the lack of the time frame is indicative, in accordance with the present embodiment, of unavailability of the network to handle the data traffic during the missing frames. The example of command file 100 also comprises a code 101 indicative of the type of coding using by the mobile network to be emulated.

Upon completion of the command file reception step, during which, naturally, the processes relating to network activity, i.e. the uplink and downlink processes, are kept inactive, the system 10 (FIG. 1 and FIG. 2) becomes operational and able to emulate the behavior of the mobile network.

In particular, taking as a reference example a web-Browsing activity and the operation of a GSM-GPRS network in uplink mode, the user terminal 15 sends a service request, i.e. a Web-Browsing command that is read by the user side interface 35 and stored directly, in the form of Ethernet packet of determined dimensions, in the user Ram 33a by means of the uplink process that also provides, at the completion of the operation, to signal the completion of the operation to the CPU 21.

The CPU 21, by means of the control process, copies the Ethernet packet from the user RAM 33a into the program and local data RAM 23 and with discrete cadence of 20 ms, taking into account the configuration of the bits in the uplink files and of the associated parameters indicative, for instance, of the type of coding and of the time frames to he handled, scans the Ethernet packet until reaching or slightly exceeding the dimensions of the packet.

After completing said scanning operation, the CPU 21, through the control process, moves the content of the packet from the program and local data RAM 23 to the network RAM 33b and signals the completion of the control process to the uplink process so that the uplink process completes the functions in uplink mode, directly transferring the Ethernet packet from the network RAM 33b to the network terminal 16 by means of the network interface 36.

Naturally, as is readily understandable by the person versed in the art, the transfer times from the user terminal 15 to the user RAM 33a and those from the network RAM 33b to the network terminal are to be deemed, thanks to the architecture of the system 10 and, in particular, of the emulator 12 as described, shorter by at least 1 or 2 orders of magnitude than the times for scanning the Ethernet packet emulated with the control process and hence to have no influence on the uplink process in emulation.

The downlink process, assumed for the sake of simplicity as the process of transferring data from the network terminal 16 to the user terminal 15, follows procedures equivalent to those described above and, as is readily apparent to a person versed in the art, is concurrent with the uplink process.

In particular, taking as a reference example a transfer activity or "download" from an Internet site to the mobile terminal in downlink mode for a GSM-GPRS network, the network terminal 16, similar in this case to an Internet site, sends one or more Ethernet packets to the network interface 36 and stores them directly in the network RAM 33b through the downlink process which, at the completion of the operation, signals such completion of the operation to the CPU.

The CPU 21, by means of the control process, copies each packet in succession from the network RAM 33b in the program and local data RAM 23 and with discrete cadence of 20 ms, taking into account the configuration of the bits in the downlink file and of the associated parameter indicative, for instance, of the type of coding and of the time frame to be managed, scans in sequence each Ethernet packet until reaching or slightly exceeding the dimensions of the packet.

Once this scanning operation is completed, the CPU 21,—by means of the control process, transfers the content of each packet scanned by the program and local data RAM 23 to the user RAM 33a and signals to the downlink process the completion of the control process for the scanned packet in such a way that the downlink process performs functions in downlink mode directly transferring the Ethernet packet scanned by the user RAM 33a to the user terminal 15. Naturally, such operations continue until all Ethernet packets are scanned and transferred to the user terminal by means of the user side interface 35.

In addition to the functions described, the CPU 21, by means of the control process, in accordance with the present embodiment, is able, on the basis of the programs developed during the design of the system 10 and stored in the RON 22 or coming from the control terminal 14, to receive and service information requests coming from the control terminal 14, such as:

quantity of bits transferred per unit of time in the various modes, total packet transfer times, and to return such information to the control terminal 14, so that the control terminal can generate and, for example, display by means of known processing programs, statistical curves relating to the behavior of the network in the various conditions.

The described system 10 allows, therefore, to emulate the behavior of a mobile network and to make the effect of such behavior visible to the user. The commands, for example for Web-Browsing, introduced by means of the user terminal 15, and the replies of the network terminal 16 are dynamically controlled (filtered) with command files, for instance generated with network simulators or by means of measuring instruments, in such a way as to be timed in a manner equivalent to the behavior, instant-by-instant, of the network; in this way it is thus possible to render perceptible on the user terminal 15 an/or on the network terminal 16, in visual or equivalent manner, the delay and/or information loss and/or distortion effect introduced by the mobile network to be emulated.

In general, the system 10 and the emulator 12, as described, are able to implement the functionality of segmenting and reassembling packets, for instance of the Ethernet type, in accordance with a predefined standard or protocol; for instance in the case of the GSM-GPRS protocol the system 10 is able to reproduce the RLC-MAC (Radio Link Control-Medium Access Control) layer and to represent in realistic fashion on the user terminal the delay and/or information loss and/or distortion effect introduced by the mobile network.

The system 10 has been described assuming that the emulator would be connected to a single network terminal 16, but as is readily apparent to a person versed in the art, the system 10 is also able to support configuration in which the network interface 36 is connected to a network of the Intranet type, known in itself, able to be accessed by multiple terminals or network servers able selectively to respond to a plurality of functions activated by the user terminal 15.

In the described embodiment, it was assumed that the CPU 21 manages the command files without introducing additional delay or distortion parameters, but as is readily apparent to a person versed in the art, this constraint can be easily overcome by providing additional functionalities of the control process, such as the introduction of parameters representing:

introduction of erroneous bits in the packets,
loss of packets,
duplication of packets,
modification of the order of arrival of the packets.

The system 10 has been described taking a GSM-GPRS mobile network as reference but, as is readily apparent to a person versed in the art, this system can be used for other types of network simply by adapting, on a case by case basis, the uplink, downlink and control processes, as well as the control files, to the type of network to be emulated.

The operation of the system 10 has been described taking a Web-Browsing activity or service as reference but, as is readily understood to a person versed in the art, with the system 10 and the emulator 12 according to the present invention it is also possible to emulate various types of functionalities or services, such as:

Web-Phone;
Video Telephone;

etc. depending on the service needs requested by the user on each occasion. Obvious modifications or variations are possible to the above description, in the dimensions, shapes, materials, components, circuit elements, connections and contacts, as well as in the details of the circuitry and of the construction illustrated herein and of the operating method without thereby departing from the spirit of the invention as specified below.

The invention claimed is:

1. A system for emulating mobile networks, the system comprising:

a first terminal representative of a mobile apparatus able to request an exchange of information by means of a mobile network having time cadence in accordance with a predefined standard;

at least one second terminal representative of an apparatus able to effect said exchange of information with said mobile apparatus by means of said mobile network;

an emulator device interposed between said first terminal and said second terminal and able to control said exchange of information by dynamically applying to said information predetermined parameters with a time cadence corresponding to the time cadence of said mobile network, said time cadence being provided to an input of said emulator device by means of a command file comprising a plurality of strings, each string having associated an index indicative of said time cadence and including a plurality of bits, said plurality of bits having a configuration indicative of the possibility of occupation of physical channels of said mobile network by said exchanged information, said emulator device being able to emulate said exchange of information between said first and second terminal taking into account said time cadence and said configuration of said plurality of bits.

2. The system claimed in claim 1, wherein in said configuration of said plurality of bits, each bit is associated with a value indicative of the possibility of occupation of a physical channel of said mobile network.

3. The system claimed in claim 1, wherein said second terminal is able to represent in realistic fashion the behavior of said mobile network according to said predetermined parameters.

4. The system claimed in claim 1 wherein said behavior of said mobile network corresponds to functionalities in uplink and/or downlink mode.

5. The system claimed in claim 1 wherein said first terminal is able to carry out a web-browsing activity.

6. The system claimed in claim 5 wherein said second terminal is able to carry out a data transfer or download activity in response to said web-browsing activity.

7. The system claimed in claim 1, further comprising
a third terminal connected to said emulator device and able to transfer said predetermined parameters to said emulator device.

8. The system claimed in claim 7, wherein said third terminal is able to receive from said emulator device dynamically determined parameters relating to said information exchange.

9. A device for emulating mobile networks, the device comprising:

a first interface able to be connected to a first terminal representative of a mobile apparatus able to request an exchange of information by means of a mobile network having time cadences in accordance with a predefined standard;

a second interface able to be connected to a second terminal representative of an apparatus able to carry out said information exchange with said mobile apparatus by means of said mobile network;

a control circuit interposed between said first and said second interface and able to control said information exchange by dynamically applying predetermined parameters to said information with a time cadence corresponding to the time cadence of said mobile network, said time cadence being provided to an input of said control circuit by means of a command file comprising a plurality of strings, each string being associated with index indicative of said time cadence and including a plurality of bits, said plurality of bits having a configuration indicative of the possibility of occupation of physical channels of said mobile network by said exchanged information, said control circuit controlling said exchange of information between said first and second interface taking into account said time cadence and said configuration of said plurality of bits.

10. The device claimed in claim 9, further comprising a data transfer circuit associated to said first and second interface and able to transfer said information independently from said control circuit.

11. The device claimed in claim 10 wherein said data transfer circuit is associated with at least one memory interposed between said first and second interface and able to store said exchanged information.

12. The system claimed in claim 1, wherein
said first terminal is able to represent in realistic fashion the behavior of said mobile network according to said predetermined parameters.

13. The device claimed in claim 10, wherein in said configuration of said plurality of bits, each bit has associated a value indicative of the possibility of occupation of a physical channel of said mobile network.

* * * * *